March 27, 1934.  W. F. RICHARDS  1,952,778
COUPLER
Filed May 4, 1928    2 Sheets-Sheet 1
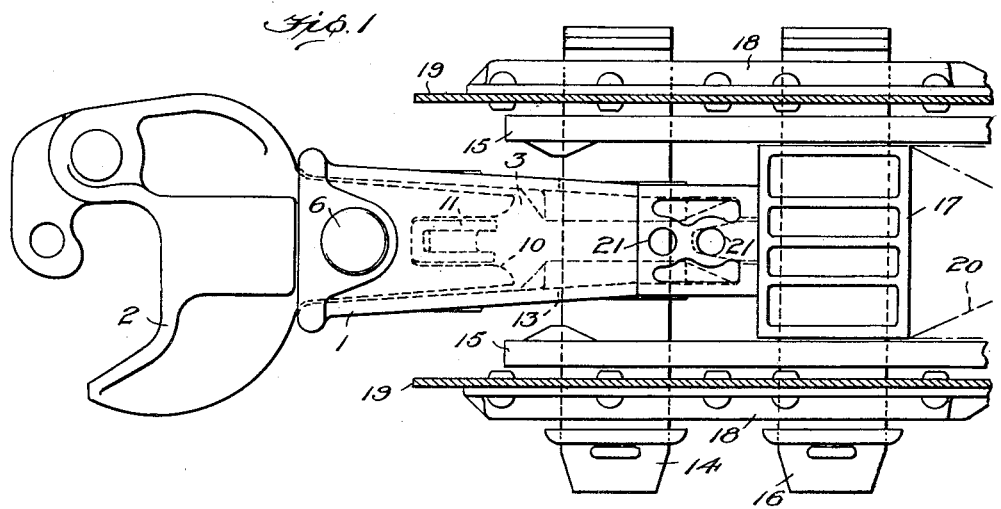
Fig. 1
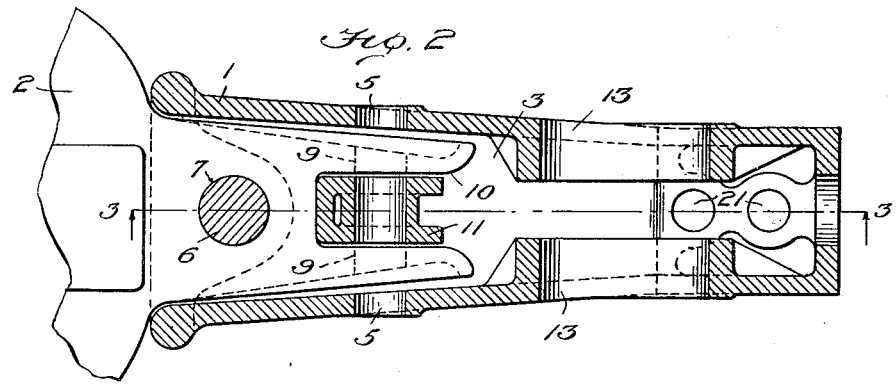
Fig. 2
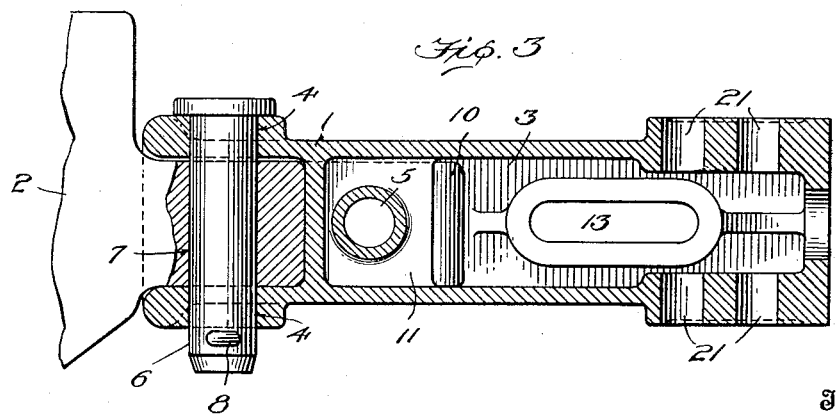
Fig. 3
Inventor
Willard F. Richards
By
Attorney March 27, 1934.  W. F. RICHARDS  1,952,778
COUPLER
Filed May 4, 1928  2 Sheets-Sheet 2
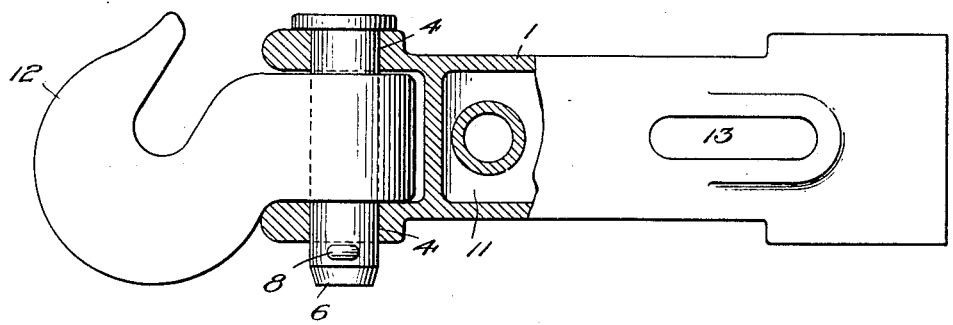
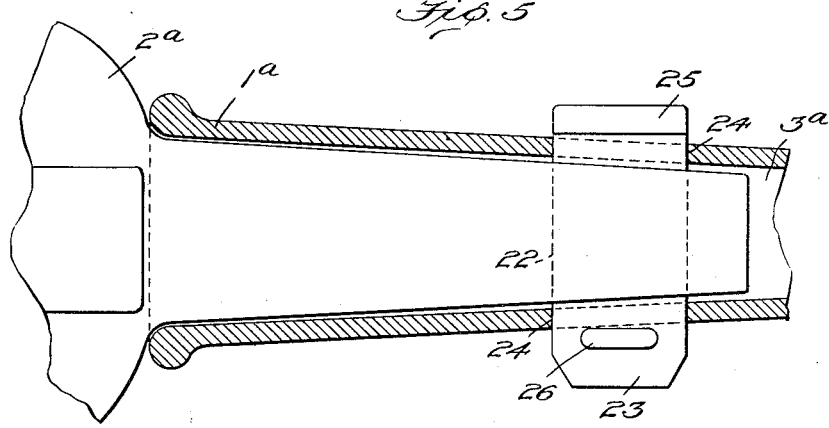
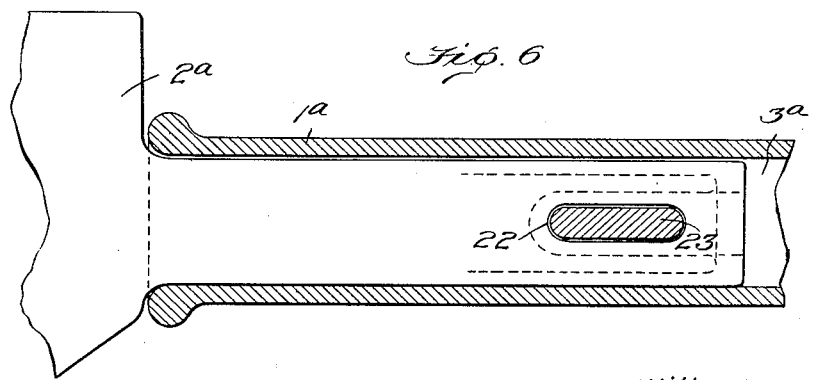
Inventor
Willard F Richards Patented Mar. 27, 1934

1,952,778

UNITED STATES PATENT OFFICE 1,952,778

COUPLER

Willard F. Richards, Depew, N. Y., assignor to
The Gould Coupler Company, New York, N. Y.,
a corporation of Maryland Application May 4, 1928, Serial No. 275,231

4 Claims. (Cl. 213—63)

This invention relates to couplers, and more particularly to a transition coupler for use on railways where a change is being made from hook or link and pin type couplers to automatic couplers.

The principal object of my invention, generally considered, is to provide a transition coupler comprising a shank portion formed with a forwardly opening pocket or cavity adapted to receive the stem of an automatic or other form of coupler, whereby rolling stock equipped with such couplers may be used with equipment provided with either automatic or other usual types of couplers.

Another object of my invention is to provide a coupler shank formed with a forwardly opening cavity adapted to receive the separable coupler head which may be either one of the automatic type or other usual form of coupler.

A further object of my invention is to provide coupling mechanism involving a coupler shank portion with a forwardly opening pocket providing a sheath for the stem portion of a coupler head of either the hook, link and pin or automatic type of couplers, means passing through registering apertures in the stem of the associated coupler head and the shank portion being provided for connecting the parts together, the rear end of said shank portion being slotted or otherwise formed for connection with an associated yoke.

Other objects and advantages of the invention relating to the particular arrangement and construction of the various parts will become apparent as the description proceeds.

Referring to the drawings illustrating my invention, the scope whereof is defined by the appended claims:

Figure 1 is a plan of a form of separable head coupler embodying my invention and shown connected with an associated yoke and other parts of the draft rigging by a horizontal key, the associated center sills being shown in section.

Figure 2 is an enlarged fragmentary plan view of the coupler head, the associated shank portion being shown in horizontal section.

Figure 3 is a vertical sectional view on the line 3—3 of Figure 2, looking in the direction of the arrows.

Figure 4 is a side elevational view, shown partly in vertical section, of the shank portion shown in the preceding figures, the automatic coupler head associated therewith having been replaced by a coupling device of the hook type.

Figures 5 and 6 are sectional views corresponding to Figures 2 and 3, respectively, but showing a modification.

Referring to the drawings in detail, like parts being designated by like reference characters, and first considering the form of my invention shown in Figures 1 to 4, inclusive, there is shown a coupler shank 1 with a removable or separable head portion 2. In order to provide for connection and disconnection of the parts, the shank portion 1 is formed with a forwardly opening cavity 3 preferably flaring slightly forwardly and provided with registering vertical apertures 4 and horizontal apertures 5 in the sides thereof. The vertical apertures 4 are shown receiving a connecting pin 6 which extends through a corresponding aperture 7 in the stem of the coupler head 2, said pin being retained in place in any desired manner as by means of a cotter 8 through a corresponding aperture in the lower end thereof, the other end being desirably headed. The horizontal apertures 5 and corresponding apertures 9 in the stem of the coupler head are adapted to receive a similar pin for increasing the strength of connection between the coupler stem and shank. The end of the coupler stem portion is desirably bifurcated, as indicated at 10, with the separated portions thereof extending on either side of a central abutment portion 11, dividing the cavity 3 into laterally spaced portions and presenting a flat abutment surface against which the coupler stem engages for taking buffing strains off the connecting pin or pins. A rearward or horizontal connecting pin, not shown, is adapted to extend through said abutment portion 11 and the side walls of the shank 1.

The coupler head 2 is of the automatic type and is adapted to be replaced by other forms of heads such as the hook type head 12 illustrated in Figure 4, said head 12, however, being only illustrative of another form of head different from the automatic head 2. It will be understood that not only may hook type heads be employed but that link and pin type mechanism of the well known character may likewise be employed and connected to the shank 1 either by a pin passing through the apertures 4 or one passing through the apertures 5 in the shank 1.

In order to provide for connection with associated yokes, the shank 1 is preferably formed with a slot 13 for receiving an associated horizontal key 14, shown in Figure 1 as connected with a horizontal yoke 15. The associated rear key 16, front follower 17, and cheek plates 18 are also illustrated in Figure 1, said cheek plates being shown connected to the webs of associated center sills 19 and the associated cushioning mechanism being diagrammtically indicated by dot and dash lines at 20. The end of the shank 1 is also desirably formed with registering vertical apertures 21 for receiving connecting means between said shank and an associated vertical yoke if used.

Referring now to the embodiment of my invention illustrated in Figures 5 and 6, a form of separable head coupler is there illustrated embodying a shank 1a and a head 2a. Said shank, as in the previous embodiment, is formed with a forwardly opening cavity 3a receiving the correspondingly tapered stem portion of the coupler 2a, the end of said stem portion being in the present embodiment formed with a horizontal slot 22 receiving a short horizontal key 23 passing through registering apertures 24 in the sides of the shank portion, and desirably held in place by being headed at one end, as shown at 25, and receiving a cotter or other retaining means 26 through the other end thereof. Although the key 23 is illustrated as of the horizontal type, it is obvious that I may use a vertical key or a pin extending either horizontally or vertically, as in the previous embodiment. That portion of the shank 1 beyond the end of the stem of the coupler 2a, which is illustrated as broken away, may be formed in any desired manner. For example, it may be slotted to receive a horizontal key or other connecting means, as in the first embodiment.

Although only an automatic coupler head is illustrated in the present embodiment, it is obvious that I intend to provide for the replacement of this head by a head of the hook type, as illustrated in Figure 4, or by link and pin type coupling mechanism of the well known character so that the shank 1a is adapted for use during the transition period on a railway when primitive forms of coupling devices are being replaced by automatic couplers.

Having thus described my invention, I claim:

1. In combination, a coupler head formed with a stem having a flat rearwardly facing surface and rearwardly extending bifurcations at opposite sides of said surface, and a separable shank with walls providing a forwardly opening pocket adapted to receive said stem, a pair of said walls being integrally joined by a portion presenting a flat abutment surface normally engaging the flat surface of the stem between the bifurcations thereof, said abutment portion, the walls of the shank on opposite sides thereof, and the stem being formed with registering apertures for receiving means for connecting said stem and shank, the walls joined by said abutment portion and the corresponding portions of the stem being formed with registering apertures for receiving additional connecting means.

2. In combination, a coupler head formed with a stem having a flat rearwardly facing surface and rearwardly extending bifurcations at opposite sides of said surface, and a separable shank with walls providing a forwardly opening pocket adapted to receive said stem, a pair of said walls being integrally joined by a portion presenting a flat abutment surface normally engaging the flat surface of the stem between the bifurcations thereof, the walls joined by said abutment portion and the corresponding portion of the stem being formed with registering apertures for receiving means for connecting said stem and shank.

3. A coupler shank with walls providing a forwardly opening pocket adapted to receive the stem of a separable head, a pair of said walls being integrally joined by a portion presenting a forwardly facing flat abutment surface adapted to engage a corresponding flat surface on said stem between bifurcations thereof, said abutment portion being spaced from a pair of walls of said stem for the reception of said bifurcations on opposite sides thereof, said abutment portion and the walls of the shank on opposite sides thereof being formed with registering apertures for receiving means which pass therethrough and through corresponding apertures in said stem for connecting said stem and shank, the walls joined by and forwardly of said abutment portion being formed with registering apertures for receiving additional connecting means.

4. A coupler shank with walls providing a forwardly opening pocket adapted to receive the stem of a separable head, a pair of said walls being integrally joined by a portion presenting a forwardly facing flat abutment surface adapted to engage a corresponding flat surface on said stem between bifurcations thereof, said abutment portion being spaced from a pair of walls of said stem for the reception of said bifurcations on opposite sides thereof, the walls joined by and forwardly of said abutment portion being formed with registering apertures for receiving means for connecting said stem and shank.

WILLARD F. RICHARDS.